Figure 1:
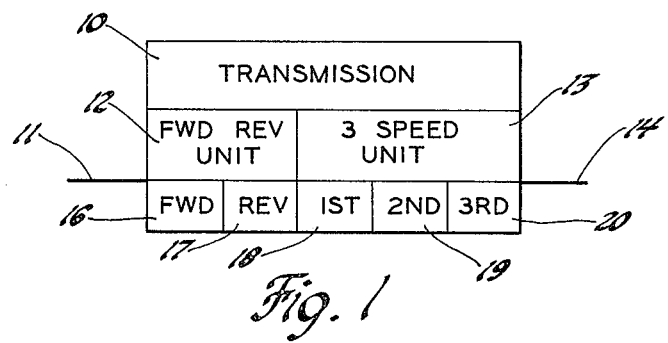

United States Patent [19]
Lentz

[11] 3,937,107
[45] Feb. 10, 1976

[54] DOWNSHIFT INHIBITOR FOR A POWERSHIFT TRANSMISSION

[75] Inventor: Carl A. Lentz, Mooresville, Ind.
[73] Assignee: General Motors Corporation, Detroit, Mich.
[22] Filed: Dec. 23, 1974
[21] Appl. No.: 535,347

[52] U.S. Cl. .................... 74/861; 74/865; 74/868
[51] Int. Cl.² ............................................ B60K 41/04
[58] Field of Search ............ 74/861, 865, 867, 868, 74/869, 740, 752 C, 645

[56] References Cited
UNITED STATES PATENTS

| | | | |
|---|---|---|---|
| 3,013,574 | 12/1961 | Breting | 137/115 |
| 3,016,769 | 1/1962 | Christenson et al. | 74/645 X |
| 3,378,119 | 4/1968 | Schaefer | 192/4 |
| 3,459,071 | 8/1969 | Schaefer | 74/75 B |
| 3,691,872 | 9/1972 | Schaefer | 74/645 X |
| 3,793,906 | 2/1974 | Williams et al. | 74/740 X |

Primary Examiner—Samuel Scott
Assistant Examiner—Lance W. Chandler
Attorney, Agent, or Firm—A. M. Heiter

[57] ABSTRACT

A transmission having a fluid operated forward and reverse drive gear unit and a three speed gear unit to provide three forward and three reverse speed drives. A one-two relay valve in downshift position provides first speed drive and on upshift functions with a downshifted two-three relay valve to provide second speed drive. The two-three relay valve on upshifts provides third speed drive. The one-two relay valve is upshifted in response to either forward or reverse second pressure and the two-three relay valve will upshift in reponse to either forward or reverse third pressure. Each relay valve will downshift in the absence of such pressure except when output speed is above a predetermined value. A manual selector valve is operative in first, second or third forward drive positions to provide first forward pressure to engage forward drive in all forward positions, second forward pressure in second and third forward positions and third forward pressure in third forward position and similarly operative in first, second or third reverse drive positions to provide first reverse pressure to engage reverse drive in all reverse positions, second reverse pressure in second and third reverse position and third reverse pressure in third reverse position. The second forward or reverse pressure is connected to upshift the one-two relay valve. The third forward or reverse pressure is connected to upshift the two-three relay valve. This system provides manual selection of first, second or third speed in either forward or reverse drive and inhibits downshifts above a predetermined speed.

4 Claims, 2 Drawing Figures

DOWNSHIFT INHIBITOR FOR A POWERSHIFT TRANSMISSION

This invention relates to a transmission and controls and particularly to a transmission having a manual selection control system providing a plurality speed drive in both forward and reverse.

The transmission drive train has a gear train providing a plurality of speed ratio drives in both forward and reverse drive operation. Transmissions having a forward and reverse gear unit having a forward and a reverse fluid operated device to selectively establish a forward or reverse drive connected in series with a multi-speed ratio gear unit having a plurality of speed ratio fluid operated devices to selectively establish a plurality of speed ratios so the transmission provides between the input and output a plurality of speed ratios in either forward or reverse drive.

The simple control system has a source of fluid pressure and an output governor providing a governor pressure, a relay shift valve and a manual valve operative in a plurality of forward or reverse positions to control the supply of fluid from said source to said forward and reverse drive devices to respectively engage forward or reverse drive and operative in both the plurality of forward and reverse positions to similarly control the relay shift valve to selectively engage a plurality of speed ratio drives in both forward and reverse drive and to disengage the speed ratio drives only below proper predetermined speeds in the same direction.

In a preferred control system, first, second and third speed ratio drives are provided in both forward and reverse. A one-two shift relay valve normally spring biased into the downshift position connects the source to a first speed device to establish first speed in a three speed ratio gear unit and is upshifted by a manual second speed signal to exhaust the first speed device and connect the source through a second third feed line and a two-three shift relay valve, when it is normally biased into the downshift position, to the second speed device to engage second speed ratio in the three speed unit. The two-three shift relay valve on upshift by a third speed signal connects the second ratio device to exhaust and the two-three feed line to the third speed device to establish the third speed ratio in the three speed unit. A manual selector valve has first, second and third ratio positions in both a forward drive range and a reverse drive range. The manual valve in the forward range connects the source in all forward speed positions to provide a first speed forward line pressure, which is connected to the forward device to establish forward drive in the forward and reverse gear unit, in second and third speed forward positions to provide a second speed forward line pressure and in third speed forward position to provide a third speed forward line pressure. The manual valve in reverse range connects the source in all reverse speed positions to provide a first speed reverse line pressure, which is connected to the reverse device to establish reverse drive in the forward and reverse gear unit, in second and third speed reverse positions to provide a second speed reverse line pressure and in third speed reverse position to provide a third speed reverse line pressure. In these range positions the lines not provided with pressure are exhausted. In neutral all these lines are exhausted and the source supply line blocked. When either the forward or reverse second speed pressure is provided in forward or reverse second position, a second speed signal is provided to upshift the one-two shift relay valve for a first to second speed shift. When either the forward or reverse second and third speed pressures are provided in forward or reverse third position, a second and third speed signal is provided to hold the one-two shift relay valve upshifted and to upshift the two-three shift relay valve to establish third speed in the three speed unit. The governor pressure is connected to each relay valve where it is blocked by a land when the relay valve is in the downshift position and admitted to an unbalanced area between two lands when the relay valve is in the upshift position to prevent a manual downshift of the relay valve in response to a manual downshift of the manual valve, which will exhaust the signal pressure until the governor pressure and speed are reduced to a proper value for a downshift. A range inhibitor prevents a shift between forward and reverse above a proper speed. In neutral position of the manual valve all of the first, second and third speed lines are exhausted so both the forward and reverse devices are disengaged to provide a positive neutral and the first speed device is engaged so on a manual valve shift to forward or reverse range first speed position, the drive is initiated respectively by the forward or reverse device and maintained during continued operation in the same range. The relay valves function in the same way to provide manually controlled shifting in the three speed unit in response to signals from the manual valve when shifted in either the forward or reverse range.

These and other features and advantages of the invention will be more apparent from the following description and drawing of a preferred embodiment.

FIG. 1 diagrammatically shows the transmission.

Figure 2:
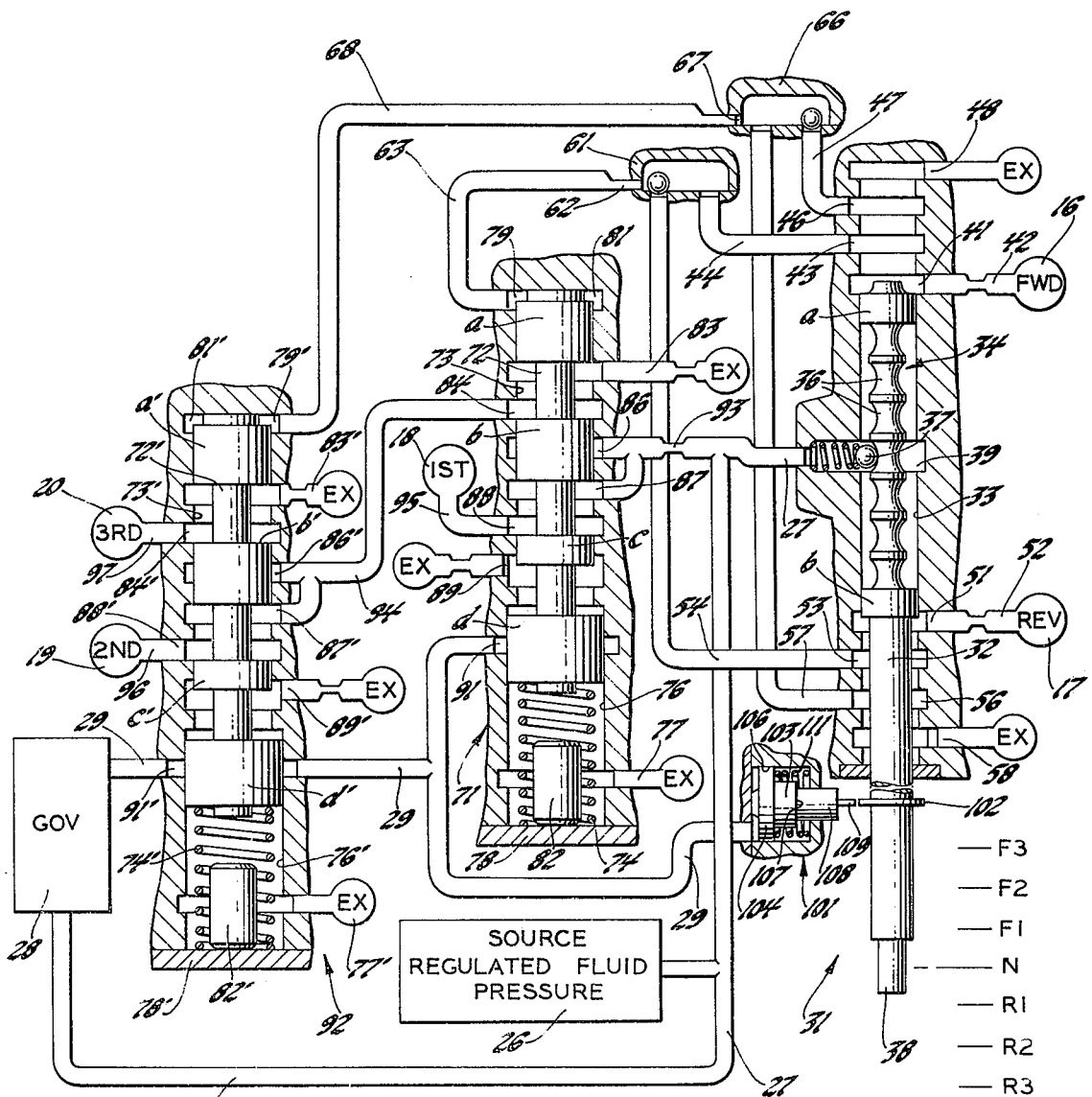

FIG. 2 diagrammatically shows the transmission control system.

The transmission 10 has an input member 11 connected by a forward and reverse gear unit 12 and a three speed gear unit 13 to provide a three speed drive in both forward and reverse to the output member 14. The forward and reverse gear unit 12 has a forward drive fluid operated friction device 16 and a reverse drive fluid operated friction device 17 which are selectively operated by the supply of apply fluid to provide respectively forward and reverse drive to the three speed gear unit 13. The three speed gear unit has a first 18, second 19 and third 20 fluid operated friction drive device for selectively establishing first, second and third ratio drives in the three speed gear unit 13 and thus three speeds in either forward or reverse as selected in the forward and reverse gear unit 12. Such gearing may have a torque converter input drive (not shown) as shown in Christenson et al U.S. Pat. No. 3,016,769 patented Jan. 16, 1962 which shows examples of such gearing and is incorporated by reference.

The controls have a source of regulated fluid pressure 26, typically a pump and regulator valve, supplying fluid at regulated fluid pressure to the main line 27.

The main line 27 is connected to a conventional governor 28 of the flyweight or pitot type driven by output member 14 at a speed proportional to output speed and providing a governor pressure in governor line 29 proportional to output speed.

The manual selector valve 31 has a valve element 32 having equal diameter lands $a$ and $b$ slidable in a bore 33 from the netural position N shown in one direction to first, second and third forward positions F1, F2 and F3 and in the opposite direction to first, second and third reverse positions R1, R2 and R3. The valve element is detent retained in each of these positions by the detent mechanism 34 having seven grooves 36 between the lands and a spring loaded ball detent 37 in a blind cross bore and manually moved by operator portion 38. The main line 27 is connected to central supply port 39 which feeds main line pressure to the bore 33 between lands *a* and *b* in all valve element positions. In the neutral position port 39 is centered between the lands and the lands block the supply fluid in the bore. Beyond land *a*, the bore 33 has consecutively a forward port 41 connected by a restricted line 42 to the forward drive device 16, a second forward speed port 43 connected to second forward speed line 44, a third forward speed port 46 connected to third forward speed line 47 and an exhaust port 48. Beyond the land *b*, the bore 33 has consecutively a reverse port 51 connected by restricted passage 52 to the reverse drive device 17, a second speed port 53 connected to second reverse speed line 54, a third speed reverse port 56 connected to third speed reverse line 57 and exhaust port 58.

In the neutral position shown the main line 27 supply is blocked between the lands *a* and *b* and the forward port 41, second forward port 43 and third forward port 46 are connected to exhaust port 48 and the reverse port 51, second reverse port 53 and third reverse port 56 are connected to exhaust 58. In first forward F1 main line port 39 is connected to forward port 41 and other ports as in neutral remain connected to their exhaust. In second forward F2 main line port 39 is connected to forward port 41 and second forward port 43 and the other ports remain connected to their exhaust. In third forward F3 main line port 39 is connected to forward port 41, second forward port 43 and third forward port 46 and the reverse ports remain connected to exhaust port 58. In first reverse R1 main line port 39 is connected to reverse port 51, the other ports remaining connected to their exhaust as in neutral. In second reverse R2 main line port 39 is connected to reverse port 51 and second reverse port 53 while the other ports remain connected to exhaust. In third reverse R3 the main line port 39 is connected to reverse, second reverse and third reverse ports 51, 53, 56 while the forward ports remain connected to exhaust port 48.

The forward and reverse second speed lines 44 and 54 are connected to the inlets on the same side of the second speed ball shuttle valve 61 having a restricted outlet 62 at one end to the second speed signal line 63. The forward and reverse third speed lines 47 and 57 are connected to the inlets on the same side of the ball shuttle valve 66 having a restricted outlet 67 at one end to third speed signal line 68. Both shuttle valves have a ball responsive to fluid pressure supply in either inlet to seal the other inlet and thus to connect the supply in either inlet under pressure to the outlet.

The first second shift relay valve 71 has a valve element 72 having small equal diameter lands *a*, *b* and *c* and larger land *d* slidable in a stepped bore 73 between the downshift position shown and an upshift position. The spring 74 located in the spring chamber portion 76 of the bore 73 beyond land *d* and vented by exhaust 77 is seated on spring seat 78 fixed to the valve body and enGages the end of land *d* to bias the valve element 72 to the downshift position.

Signal pressure supplied to signal port 79 and signal chamber 81 at the opposite closed end of the bore acts on the end of land *a* to bias the valve element against the spring to the upshift position where movement is limited by the stop and spring guide member 82 also seated on spring seat 78. The valve bore has consecutively from the signal chamber end of the bore high restricted exhaust port 83, high feed port 84, high supply port 86, low supply port 87, low feed port 88, low restricted exhaust port 89 and governor port 91. With the valve element in the downshift position shown, the high feed port 84 is connected between land *a* and *b* to exhaust port 83. The high supply port 86 is blocked by land *b*. The low supply port 87 is connected between lands *b* and *c* to low feed port 88. The low exhaust port 89 is blocked between lands *c* and *d*. The governor port is blocked by land *d*. In the upshift position land *a* blocks exhaust port 83, high supply port 86 is connected to high feed port 84, low supply port 87 is blocked by land *b*, low feed port 88 is connected between lands *b* and *c* to low exhaust 89 and governor port 91 is connected between lands *c* and *d* to act on the unbalanced area to bias the valve element to upshift position to hold the shift valve upshifted at higher speeds.

The two-three shift relay valve 92 is essentially similar to the one-two shift relay valve 71 so like reference numerals primed have been applied and the above description of the 1–2 relay valve 71 applies to the 2–3 relay valve 92.

These valves are combined in a shift control system with the source 26 connected by main supply line 27 to supply port 39 of the manual selector valve 31, to the governor 28 and through restriction 93 to the supply ports 86 and 87 of the one-two relay valve 71. The manual selector valve 31 has its first speed forward port 41 and restricted line 42 connected to forward drive device 16 and its first speed reverse port 51 and restricted line 52 connected to reverse drive device 17. The high feed port 84 of the one-two relay valve 71 is connected by the two-three feed line 94 to both the supply ports 86' and 87' of the two-three relay valve 92. The low feed port 88 of the one-two relay valve 71 is connected by the first feed line 95 to the first drive device 18. The low feed port 88' and the high feed port 84' of the two-three relay valve 92 are respectively connected by the low and high feed lines 96 and 97 to the second speed device 19 and the third speed device 20.

A range inhibitor 101 prevents a shift between the forward and reverse ranges above a proper speed, normally lower than the two-one shift inhibiting speed. The inhibitor has a stop ring 102, i.e., a snap ring, secured to manual valve element 32 centrally in a smooth portion with a smooth portion on each side a little longer than the valve element is moved. A piston member 103 has a piston portion 104 slidable in bore 106 closed by end walls at both ends, a stop shoulder 107, a stem 108 and a narrow stop portion 109. The governor line 29 is connected to one closed end of the bore 106 to act on piston portion 104 and at a perdetermined speed overcome the bias of the return spring 111 which is seated between the piston portion 104 and the wall closing the other end of bore 106. There is sufficient clearance for venting the bore between stem 108 and the aperture through which it extends in the other end wall. The governor pressure will move the piston member to th inhibiting position in which stop shoulder 107 engages the wall at the other end of the bore.

The piston member has a stem 108 extending in guided non sealing relation through an aperture in the other end wall and has at its end a stop portion 109, which in the inhibiting position has a small clearance with valve element 32 and engages the side of stop ring 102 so the range inhibitor prevents movement past neutral above a predetermined speed. The range inhibitor in inhibiting position permits free movement of manual valve element 32 through all the speeds of either forward range or reverse range and from either range to neutral but not from one range to the other range. At lower speeds the bias of return spring 111 returns the piston member 103 against lower governor pressure so there is clearance between stop portion 109 and stop ring 102 so the valve element 32 can be freely moved.

OPERATION

When the vehicle engine is running and driving transmission input 11, the source 26 supplies fluid at a regulated pressure to the main line 27. When the manual selector valve 31 is in neutral position N, the main line supply through port 39 to the bore 33 is blocked between the lands *a* and *b* of the manual valve element 32 and the first, second and third speed forward lines 42, 44 and 47 and their ports 41, 43 and 46 are connected to exhaust 48 and the first, second and third speed reverse lines 52, 54 and 57 and their ports 51, 53 and 56 are connected to exhaust 58. Thus the forward drive device 16 is exhausted by port 51 to exhaust 58 to provide positive neutral in the forward and reverse gear unit 12 and transmission 10. Since the second and third speed forward lines 44 and 47 are connected to exhaust 48 and the second and third speed reverse lines 54 and 57 are connected to exhaust 58 the shuttle valves 61 and 67 are not supplied with any pressure and signal lines 63 and 68 are connected to one of exhausts 48 and 58 so each of the one-two and the two-three relay valves 71 and 92 are biased by their respective biasing spring 74 and 74' to the downshift position shown. The source is connected through the portion of main line 27 having restriction 93 to both supply ports 86 and 87 of the one-two relay valve 71. The supply port 86 is blocked by land *b* and supply port 87 connected between equal area lands *b* and *c* to port 88 and first speed device 18 of the three speed gear unit 13 to engage first speed drive in this unit but since the forward and reverse unit 12 is in neutral the transmission 10 remains in position neutral.

When the manual selector valve 31 is moved to first forward position F1, main line 27 is connected by ports 39 and 41 and first speed passage 42 to engage forward device 16 to provide, with the first speed device still engaged as in neutral, first speed forward drive. When the manual valve 31 is moved to second forward position F2, the above supply to the forward device 16 continues and in addition there is a main line supply by ports 39 and 43 to second speed line 44 through shuttle valve 61, which blocks exhaust to second speed reverse line 54, to second signal line 63 which actuates the actuator device, chamber 81 and land 72a to upshift the one-two relay valve element 72. Then there is a supply from main line 27 by port 86 between lands 72a and *b* through port 84 to feed line 94 to the two-three relay valve 92. The downshifted two-three relay valve continues this supply by ports 87', 88' and second feed line 96 supplies second drive device 19 to engage second forward drive. The first forward drive is released as first device 18 is connected by line 95 and port 88 to exhaust 89 at the one-two relay valve 71. When the one-two relay valve 71 upshifts, governor pressure is supplied by port 91 to the space between lands *c* and *d* and acts on the unbalanced area of larger land *d* to oppose the biasing spring 74 to prevent, when second signal pressure in line 63 is exhausted by manual valve shift to first forward, a downshift of the one-two relay valve and thus the transmission to first forward drive above a predetermined speed. When vehicle speed decreases below the second to first shift inhibiting speed to the predetermined speed for a second first downshift, the governor pressure inhibiting force in an upshift direction is overcome by the spring force in a downshift direction to effect a downshift of the one-two relay valve 71. On such downshift the land *d* of valve element 22 blocks governor port 91 and the space between lands *c* and *d* is connected to exhaust port 89, so there is no governor pressure acting on the valve element 72. Since governor pressure does not act on the valve element 72 in the downshift position but only acts on the valve element in the upshift position, there is full governor pressure hysteresis to prevent hunting on the governor controlled downshift. It will be noted that this governor inhibitor force does not act to upshift the shift valve element but only acts after a manual upshift to inhibit a manual second first downshift above a predetermined speed and then provide such shift at the predetermined speed.

When the manual valve is moved to third forward position F3, the main line remains connected in the same way to the forward device 16 and to the second speed line 44 and chamber 81 to continue engagement of the forward drive device 16 and to continue to hold the one-two relay valve 71 in the upshift position and in addition connects main line 27 by ports 39 and 46 to third forward feed line 47. The third shuttle valve connects third forward feed line 47 to third signal line 68 and prevents exhaust to third reverse feed line 57. The third signal line 68 acts in actuator device chamber 81' on land 72'a' to upshift the second third relay valve 92, which in the upshift position connects second speed device 19 by port 88' to exhaust 89' to disengage the second speed drive and connects main line pressure from two-three feed line 94 by ports 86' and 84' to third speed device 20 to engage the third forward speed drive. On upshift of the second third relay valve 92 the governor pressure from line 29 is admitted by port 91' between the lands 72'c' and *d'* to act on the unbalanced area of land *d'* to prevent a downshift of this relay valve by spring 74' in the absence of third signal pressure in line 68 at third second downshift inhibiting vehicle speeds above a predetermined vehicle speed. When the vehicle speed decreases to the predetermined three two shift speed, the spring 74' downshifts the three two relay valve 92. As in the one two relay valve 71, governor pressure does not act on the two three relay valve 92 in the downshift position providing hysteresis.

The governor pressure increases with vehicle speed. The governor controlled downshift of the two three relay valve 92 is made at a higher vehicle speed than the governor controlled downshift of the one two relay valve 71, so the resulting engine speed after both downshifts is about the same normal maximum operating speed. Since the relay valves are preferably structurally the same providing the same differential area between lands *c* and *d* and land *c'* and *d'* the spring 74' of the two three relay valve 92 provides a higher force than spring 74 of the one two relay valve 71.

The operation for reverse drive is similar. On a shift of manual valve 31 from neutral to first reverse position, main line 27 is connected by ports 39 and 51 to first speed reverse line 52 to engage reverse drive device 17. The first drive device 18 remains engaged as in neutral and first speed reverse drive is engaged. On a shift of the manual valve to second reverse position R2, the reverse drive device 17 remains engaged and main line 27 is connected by ports 39 and 53, second speed line 54, second shuttle valve 61 to signal line 63 to upshift the one two shift valve. The shift relay valves 71 and 72 then function as in forward drive to disengage first drive device 18 and engage second drive device 19 and to inhibit a downshift above a predetermined speed. When the manual valve 31 is moved to third reverse position R3 the above manual valve connections in second reverse are retained and in addition main line 27 is connected by ports 39 and 56, third speed reverse line 57, third shuttle valve 66 to signal line 68 to upshift the second third relay valve 92. Both relay valves when upshifted function as in forward drive to establish third speed reverse drive. The shift inhibiting system functions in reverse to prevent reverse range downshifts above the same predetermined speeds as in forward range.

The range inhibitor 101 will be in the released position on a shift from neutral to either forward or reverse first speed. As the output speed in either first forward or first reverse drive increases the range inhibitor will move to inhibiting position but will have no inhibiting effect on further shifts in either range, but is only effective if a manual shift is attempted from one of the forward or reverse ranges past neutral to the other range above a predetermined speed. The range inhibitor will permit a shift from either range to neutral and back to the same range above the predetermined speed.

The predetermined range inhibiting speed is less than the second to first shift inhibiting speed, so the transmission is in first speed in either range before it is shifted to first speed in the other range and normally a sufficiently low vehicle speed so the shift shock on shifts between ranges is acceptable. This transmission is particularly suitable for material handling vehicles such as fork lift trucks where the range inhibiting speed is about one half the second to first inhibiting speed.

It will be appreciated that modifications of the disclosed preferred embodiment may be made.

It is claimed:

1. In a transmission; an input; an output; a forward and reverse gear unit driven by said input and having a forward and a reverse drive fluid operated device for selectively establishing forward and reverse drive and a three speed gear unit having first, second and third speed drive fluid operated devices for selectively establishing first, second and third speed drive connected in series to provide first, second and third speed drive to said output in either forward or reverse; a source of fluid pressure; governor means driven by said output providing a governor pressure proportional to speed of said output; a one-two and a two-three shift relay valve means each having biasing means, a valve element normally biased by said biasing means to a downshift position and signal responsive actuator means operative to upshift said valve element to upshift position and downshift inhibitor means connected to said governor means and responsive to governor pressure only in said upshift position to prevent a downshift by said biasing means above a predetermined speed and a high exhaust port, a high feed port, supply port means, a low feed port and a low exhaust port operative in downshift position to connect said supply port means to said low feed port and said high feed port to said high exhaust and in upshift position to connect said supply port means to said high feed port and said low feed port to said low exhaust port; said supply port means of said one-two relay valve means connected to said source; a two-three feed line connecting said high feed port of said one-two relay valve means to said supply port means of said two-three relay valve means; said low feed port of said one-two relay valve means connected to said first device, said low and high feed port of said two-three relay valve means respectively connected to said second and third device; manual selector valve means connected to said source and having first forward and first reverse speed lines respectively connected to said forward and reverse devices, a forward and reverse second speed line and a forward and reverse third speed line operative in neutral position to block said source and connect all said speed lines to exhaust and operative in first, second and third speed forward positions to respectively connect said source to said first forward speed line, to said first and second forward speed lines and said first, second and third forward speed lines and in first, second and third speed reverse positions to connect said source respectively to said first reverse speed line, to said first and second reverse speed lines and to said first and second and third speed reverse lines; a second speed shuttle valve connecting the one of said second forward speed line or second reverse speed line under pressure to said actuator means of said one-two relay valve means and blocking the other and a third speed shuttle valve connecting the one of said third forward speed line and third reverse speed line under pressure to said actuator means of said two-three relay valve means and blocking the other.

2. In a transmission; an input; an output; a forward and reverse gear unit driven by said input and having a forward and a reverse drive fluid operated device for selectively establishing forward and reverse drive and a three speed gear unit having first, second and third speed drive fluid operated devices for selectively establishing first, second and third speed drive connected in series to provide first, second and third speed drive to said output in either forward or reverse; a source of fluid pressure; governor means driven by said output providing a governor pressure proportional to speed of said output; a two-three feed line; one-two and two-three relay valve means each having biasing means providing a downshift bias, signal responsive means operative to provide an upshift force for upshift to upshift position against said biasing means bias and inhibiting means connected to said governor and responsive to governor pressure only in upshift position when said signal responsive means is inoperative to prevent a downshift above a predetermined speed, said one-two shift valve means operative in downshift position to connect said source to said first device and said two-three feed line to exhaust and in upshift position to connect said source to said two-three feed line and to connect said first device to exhaust; a two-three shift valve means operative in downshift position to connect said two-three feed line to said second device and said third device to exhaust and in upshift position to connect said two-three feed line to said third device and said second device to exhaust and manual selector valve means connected to and operative to control the supply of fluid from said source to and the exhaust from said signal responsive means of said one-two and said two-three relay valve means, said forward device and said reverse device operative in neutral position to disengage said forward device and said reverse device and cause both said signal responsive means to be inoperative to provide positive neutral in the forward and reverse gear unit and to engage said first device, in first forward or first reverse positions to respectively engage said forward or reverse device and with continued engagement of said first device provide first speed forward or first reverse drive, in second forward or second reverse positions to respectively continue engagement of said forward or reverse device and provide a second speed signal to said signal responsive means of said one-two relay valve means to upshift said one-two relay valve means to engage said second device to provide second speed forward or second reverse drive and in third forward or third reverse positions to respectively continue engagement of said forward or reverse device and provide a third speed signal to said signal responsive means of said two-three relay valve means to upshift said two-three relay valve means to engage said third device to provide third speed forward or third speed reverse drive.

3. The invention defined in claim 1 and range inhibitor means operatively connected to said manual selector valve means and said governor means operative above a predetermined speed to permit movement between neutral positions and either forward or reverse first, second and third position but to prevent movement from first position in either forward or reverse past neutral position to first position in the other of forward or reverse.

4. The invention defined in claim 2 and range inhibitor means operatively connected to said manual selector valve means and said governor means operative above a predetermined speed to permit movement between neutral positions and either forward or reverse first, second and third position but to prevent movement from first position in either forward or reverse past neutral position to first position in the other of forward or reverse.

* * * * *

UNITED STATES PATENT AND TRADEMARK OFFICE
CERTIFICATE OF CORRECTION

PATENT NO. : 3,937,107
DATED : February 10, 1976
INVENTOR(S) : Carl A. Lentz

It is certified that error appears in the above-identified patent and that said Letters Patent are hereby corrected as shown below:

Column 5, line 28, after "port" insert -- $41$ to exhaust 48 and the reverse drive device 17 is exhausted by port --

Signed and Sealed this fifteenth Day of June 1976

[SEAL]

Attest:

RUTH C. MASON
*Attesting Officer*

C. MARSHALL DANN
*Commissioner of Patents and Trademarks*